UNITED STATES PATENT OFFICE.

FRANK L. SLOCUM, OF PITTSBURGH, PENNSYLVANIA, ASSIGNOR TO JAMES HENRY REID, OF PITTSBURGH, PENNSYLVANIA.

PREPARATION OF CRUDE MATERIALS FOR MANUFACTURE OF CALCIUM CARBID.

1,319,426. Specification of Letters Patent. Patented Oct. 21, 1919.

No Drawing. Application filed September 10, 1917. Serial No. 190,620.

*To all whom it may concern:*

Be it known that I, FRANK L. SLOCUM, a citizen of the United States, and resident of Pittsburgh, in the county of Allegheny and State of Pennsylvania, have invented a new and useful Improvement in the Preparation of Crude Materials for Manufacture of Calcium Carbid; and I do hereby declare the following to be a full, clear, and exact description thereof.

My invention relates to a process for the preparation of crude materials suitable for the manufacture of calcium carbid, and relates particularly to improvements in the manufacture of the so-called "coke-lime" material, or mechanical combination of calcium compounds and carbon by cementing the same together through coking the calcium compounds with bituminous coal.

Among the particular advantages of the invention are that by my process the pores or air-gaps which commonly occur throughout the mass of the materials so cemented together, and which oppose high resistance to the passage of the current in the electric furnace in reducing the mass, are largely eliminated, and a great economy of current results. Second: A more perfect mixture of the calcium compound and carbon is produced; and, third, the speed of operation is considerably increased.

The crude materials generally used for the manufacture of calcium carbid are calcium oxid and carbon in the form of coke. In the usual operation of producing calcium carbid, these crude materials are usually used in the form of a mechanical mixture with necessary quantities of each mixed loosely together. One of these materials, the carbon, has practically one-half the specific gravity of that of the lime; in other words, the lime is twice as heavy as the carbon. In exposing this mixture to the action of the electric arc, a marked segregation of the mixture occurs due to the vibration of the arc, because of this difference in the specific gravities of the ingredients.

In general, there are three processes commonly employed for the manufacture of calcium carbid:—the ingot process; the tapping process; and what is known as the Reid continuous process.

Carbids are the intermediary compounds in the reduction of metallic oxids by carbon to metals. Calcium carbid is formed only at a very high temperature, decomposing at a temperature slightly above its temperature of formation into its metal. Calcium carbid, when in the melted state, is an extremely unstable compound.

In the ingot process it is necessary to maintain certain parts of the ingot at or above the melting point of carbid for a certain period of time. During this period, the calcium carbid slowly decomposes into metallic calcium, which in turn, is dissolved in the liquid carbid, becoming an impurity. Such calcium carbid containing metallic calcium yields an equivalent of hydrogen gas in proportion to the percentage of calcium dissolved in the carbid. In the tapping process, it is necessary to reduce the melting point of the carbid in order to have it flow. This is accomplished by adding an excess of lime, which dissolves readily in the calcium carbid, also becoming a diluent or impurity.

It will be seen, therefore, that by either the tapping process or the ingot process it is necessary to manufacture carbid containing more or less metallic calcium or excessive calcium oxid. These conditions in both processes are accentuated because of the segregation of the carbon and lime through the intense vibration of the arc during the period of formation or melting.

Finally, in the so-called Reid continuous process, the calcium compound and carbon are cemented together through coking the calcium compound with bituminous coal; in this way, obtaining a more perfect mixture than is possible to be obtained by mere mechanical means. And further, this firmly cemented, hard coke holds the calcium oxid and carbon in a static condition to each other in relation to the vibration of the arc. It is, therefore, possible by the Reid process to obtain as pure calcium carbid as the raw materials will yield; while, at the same time, consuming a very much lower amount of current. The manufacture of calcium carbid is not a refining process. Therefore, the impurities in the raw materials combine to form the impurities in the resultant carbid.

A defect, however, in the manufacture of so-called coke-lime by the Reid process is that pores are produced throughout the mass. These pores constitute air-gaps which create unnecessary resistance when the arc of the electric furnace is applied to the mass.

My invention, therefore, contemplates an improvement in the manufacture of this so-called coke-lime material.

It is a well-known fact that calcium hydrate loses about one-third of the water of hydration at a temperature of approximately 400° cent. It loses the balance of its water of hydration when the material is heated to approximately 450° cent.

In carrying out my improved process, therefore, I mix hydrated lime with ground bituminous coal in proper proportions and coke the same at a sufficiently high temperature to remove practically all of the volatile material, and the water of hydration in the lime. The result of this operation is that this mechanical mixture of lime and carbon is more thoroughly mixed by chemical reaction. The hydrated lime being finer than it is possible to grind it commercially, is easily saturated with the oils and tarry matter distilling from the plastic coal. After the mass has reached the temperature of 400° cent., a large percentage of the volatile matter of the coal has already been removed. Thus at this temperature, the lime begins to give off water in the form of superheated steam. This continues until the mass is heated up to or above 450° cent. During this operation, not only the molecule of the hydrated lime is broken up, but at the same time the coke is thoroughly powdered. The super-heated steam increases very materially the percentage of ammonia from the fixed nitrogen in the coal above that which is obtained by the ordinary coking processes.

This exceeding finely powdered coke-lime is then mixed with the proper percentage of carbon pitch or other suitable binder (the amount of the binder usually required is from 2 per cent. to 4 per cent.). This mixture is then heated, if necessary, until the binder becomes plastic and is then briqueted in suitable forms for use in the Reid, or other similar continuous processes. This binder also serves to slightly decrease the resistance to the electric current.

While I have herein described particular steps of the carrying out of my process and a particular order in which the steps may be carried out, it is to be understood the invention is not limited to such described process, but may be varied at will within the scope of the appended claims.

What I claim is:

1. In the manufacture of calcium carbid, the process of preparing the materials suitable for furnacing, which consists in mixing hydrated lime with ground bituminous coal and coking the same at a sufficiently high temperature to remove practically all the volatile matter in the coal, and water of hydration in the lime, and briqueting the mass in suitable form for reduction in an electric furnace.

2. In the manufacture of calcium carbid, the process of preparing the materials suitable for furnacing, which consists in mixing hydrated lime with ground bituminous coal and coking the same at a sufficiently high temperature to remove practically all the volatile matter in the coal, and water of hydration in the lime, mixing the resulting coke-lime with a suitable binder, and briqueting the mass in suitable form for reduction in an electric furnace.

3. In the manufacture of calcium carbid, the process of preparing the materials for furnacing, which consists in mixing hydrated lime and ground bituminous coal and coking the same at a sufficiently high temperature to remove practically all the volatile matter of the coal, and the water of hydration in the lime.

4. In the manufacture of calcium carbid, the process of preparing the materials for furnacing, which consists in mixing hydrated lime with bituminous coal and coking the same at a sufficiently high temperature to remove practically all of the volatile matter of the coal, and the water of hydration in the lime, mixing the resulting product with a suitable binder—preferably pitch—and preparing the mass in suitable forms for furnacing.

5. In the manufacture of calcium carbid, the process of preparing crude materials for furnacing which consists in mixing hydrated lime with bituminous coal and coking the same at a sufficiently high temperature to remove practically all the volatile matter of the coal, and the water of hydration in the lime, mixing the resulting mass with a carbon pitch or like binder in substantially the proportions of two to four per cent. of the binder, and briqueting the resultant mass in forms suitable for furnacing.

In testimony whereof, I, the said FRANK L. SLOCUM, have hereunto set my hand.

FRANK L. SLOCUM.

Witnesses:
D. PAULSON FOSTER,
IRENE F. GEYER.